United States Patent [19]
Roy

[11] Patent Number: 6,011,863
[45] Date of Patent: Jan. 4, 2000

[54] CYLINDRICAL RECTIFICATION TO MINIMIZE EPIPOLAR DISTORTION

[75] Inventor: Sebastien Roy, Pennington, N.J.

[73] Assignee: NEC Research Institute, Inc.

[21] Appl. No.: 09/052,672

[22] Filed: Mar. 31, 1998

Related U.S. Application Data

[60] Provisional application No. 60/049,427, Jun. 12, 1997.

[51] Int. Cl.[7] .................................................. G06K 9/00
[52] U.S. Cl. .............................................. 382/154; 382/285
[58] Field of Search ..................................... 382/285, 154; 345/418, 139, 419, 425, 427; 356/12, 13, 14; 348/42, 47

[56] References Cited

U.S. PATENT DOCUMENTS

| | | | |
|---|---|---|---|
| 5,602,584 | 2/1997 | Mitsutake et al. | 348/47 |
| 5,606,627 | 2/1997 | Kuo | 382/154 |
| 5,703,961 | 12/1997 | Rogina et al. | 382/154 |
| 5,825,915 | 10/1998 | Michimoto et al. | 382/154 |

OTHER PUBLICATIONS

N. Ayache et al. (1988) "Rectification of Images for Binocular and Trinocular Stereovision" *IEEE*: 11–16.
S.B. Kang et al. (1994) "An Active Multibaseline Stereo System With Real–time Image Acquisition" *Carnegie Mellon University School of Computer Science Technical Report CMU–CS–94–167*.
O. Faugeras (1993) "Chapter 6" *Three–dimensional computer vision* MIT Press: Cambridge, Massachusetts.
R. Hartley et al. (1993) "Computing Matched–epipolar Projections" *IEEE*: 549–555.
P. Courtney et al. (1992) "A Hardware Architecture for Image Rectification and Ground Plane Obstacle Detection" *IEEE*: 23–26.
D.V. Papadimitriou et al. (1996) "Epipolar Line Estimation and Rectification for Stereo Image Pairs" *IEEE*: 672–676.
L. Robert et al. (1995) "Weakly–calibrated Stereo Perception for Rover Navigation" *IEEE*: 46–51.
Q. Luong et al. (1996) "The Fundamental Matrix: Theory, Algorithms and Stability Analysis" *International Journal of Computer Vision* 17: 43–75.
I.J. Cox et al. (1996) "A Maximum Likelihood Stereo Algorithm*" *Computer Vision and Image Understanding* 63(3): 542–567.
S. Roy et al. (1996) "Motion Without Structure" *IEEE Proc. of Int. Conf. on Pattern Recognition* 1: 728–734.

*Primary Examiner*—Joseph Mancuso
*Assistant Examiner*—Vikkram Bali
*Attorney, Agent, or Firm*—Scully, Scott Murphy & Presser

[57] ABSTRACT

A method for rectifying first and second images of a single scene for stereoscopic analysis is provided. The method has first and second steps of providing the first and second images from first and second cameras. The first camera having a first optical center and a first geometry relative to the scene, the second camera having a second optical center and a second geometry relative to the scene. The first and second images each comprise a plurality of epipolar lines wherein each point on each of the epipolar lines is expressed in a first and second image coordinate system, respectively. Third and fourth steps are provided wherein each point on each epipolar line of the first and second images are rotated to be parallel to a line connecting the first and second optical centers of the first and second cameras. In fifth and sixth steps, the first and second image coordinate systems of each point on each of the epipolar lines of the first and second images are transformed to a first and second cylindrical coordinate system, respectively. In seventh and eighth steps, each rotated epipolar line of the first and second images expressed in the first and second cylindrical coordinate systems are projected onto the surface of first and second cylinders having first and second diameters, wherein each projected epipolar line of the first and second images have a position around the first and second cylinder surfaces such that rectified first and second images are formed thereon.

12 Claims, 8 Drawing Sheets

CYLINDRICAL RECTIFICATION TO MINIMIZE EPIPOLAR DISTORTION

CROSS REFERENCE TO RELATED APPLICATIONS

This is a conversion of provisional application, Ser. No. 60/049,427, filed Jun. 12, 1997.

BACKGROUND OF THE INVENTION

1. Field of the Invention

This invention generally relates to rectification of stereoscopic images, and more particularly, to a cylindrical rectification method and apparatus for rectifying stereoscopic images under arbitrary camera geometry.

2. Prior Art

Rectification is a necessary step of stereoscopic analysis. The process extracts epipolar lines and realigns them horizontally into a new rectified image. This allows subsequent stereoscopic analysis algorithms to easily take advantage of the epipolar constraint and reduce the search space to one dimension, along the horizontal rows of the rectified images. The epipolar geometry describes the relative relationship of two camera in three dimensional space. A set of corresponding epipolar lines are defined by the intersection of any plane that contains the optical center of both camera with each image plane.

For different camera motions, the set of matching epipolar lines varies considerably and extracting those lines for the purpose of depth estimation can be quite difficult. The difficulty does not reside in the equations themselves; for a given point, it is straightforward to locate the epipolar line containing that point. The problem is to find a set of epipolar lines that will cover the whole image and introduces a minimum of distortion, for arbitrary camera motions. Since subsequent stereo matching occurs along epipolar lines, it is important that no pixel information is lost along these lines in order to efficiently and accurately recover depth.

FIG. 1 depicts the rectification process. A scene S is observed by two cameras to create images $I_1$ and $I_2$. In order to align the epipolar lines of this stereo pair, some image transformation must be applied. The most common of such transformations, proposed by N. Ayache et al. (1988) "Rectification of images for binocular and trinocular stereovision" *Proc. of Int. Conf. on Pattern Recognition:* pgs. 11–16 and referred to as planar rectification, is a remapping of the original images into a single plane that is perpendicular to the line joining the two cameras' optical centers (see FIG. 1, images $P_1$ and $P_2$). This is accomplished by using linear transformation in projective space applied to each image's pixels.

The line joining the optical centers of the cameras (see FIG. 1) defines the focus of expansion (FOE). All epipolar lines intersect the focus of expansion. The rectification process applied to an epipolar line always makes that line parallel to the FOE. This allows the creation of a rectified image where the epipolar lines do not intersect and can be placed as separate rows. Obviously, both plane and cylinder remapping satisfy the alignment requirement with the FOE.

Planar rectification, while being simple and efficient, suffers from a major drawback: It fails for some camera motion, as will be discussed below. As the forward motion component becomes more significant, the image distortion induced by the transformation becomes progressively worse until the image is effectively unbounded. The image distortion induces a loss of pixel information that can only be partly compensated for by making the rectified image size larger, as will be discussed in greater detail below. Consequently, this method is useful only for motions with a small forward component, thus lowering the risk of unbounded rectified images.

Many variants of the planar rectification scheme have been proposed. See, for example, N. Ayache et al.; S. B. Kang et al. (1994) "An active multibaseline stereo system with real-time image acquisition" *Carnegie Mellon University School of Computer Science Technical Report CMU-CS-94-167*; and O. Faugeras (1993) *Three-dimensional computer vision* Cambridge, Mass.: MIT Press. A detailed description based on the essential matrix is given in R. Hartley et al. (1993) "Computing matched-epipolar projections" *Proc. of IEEE Conference on Computer Vision and Pattern Recognition:* pgs. 549–555. In P. Courtney et al. (1992) "A hardware architecture for image rectification and ground plane obstacle detection" *Proc. of Int. Conf. on Pattern Recognition* The Hague, Netherlands: pgs. 23–26 a hardware implementation is proposed. In D. V. Papadimitriou et al. (1996) "Epipolar line estimation and rectification for stereo image pairs" *IEEE Trans. Image Processing* 5(4): pgs. 672–676, the camera motion is restricted to a vergent stereo geometry to simplify computations. It also presents a faster way to compute the transformation by approximating it with a non-projective linear transformation. This eliminates the risk of unbounded images at the expense of potentially severe distortion. In L. Robert et al. (1995) "Weakly-calibrated stereo perception for rover navigation" *Proc. 5th Int. Conference on Computer Vision*, Cambridge, Mass.: 46–51, a measure of image distortion is introduced to evaluate the performance of the rectification method. This strictly geometric measure, based on edge orientations, does not address the problem of pixel information loss induced by interpolation (discussed below).

While rectification methods of the prior art (i.e., those that are based on a single linear transformation in projective space; see, N. Ayache et al., S. B. Kang et al. and O. Faugeras) have their benefits, they fail for some camera geometries.

As stated earlier, the goal of rectification is to apply a transformation to an image in order to make the epipolar lines parallel to the focus of expansion. The result is a set of images wherein each row represents one epipolar line and can be used directly for the purpose of stereo matching (see FIG. 2).

In projective space, an image point is expressed as $P=(p_x, p_y, 1)^T$ wherein h is a scale factor. Thus, we can assume these points are projected to $P=(p_x, p_y, 1)^T$.

The linear projective transformation F is used to transform an image point u into a new point v with the relation $$v = F \cdot u = \begin{bmatrix} F_0 & F_1 & F_2 \\ F_3 & F_4 & F_5 \\ F_6 & F_7 & F_8 \end{bmatrix} \cdot u \qquad (1)$$

where $v=(u_x, u_y, u_h)^T \; u=(u_x, u_y, u_h)^T \; u_h \neq 0$

The fact that $u_h \neq 0$ simply implies that the original image has a finite size. Enforcing that the reprojected point is not at infinity implies that $u_h$ must be zero, that is $u_h = u_x F_6 + u_y F_7 + u_h F_8 \neq 0 \qquad (2)$ Since $u_x$, $u_y$ are arbitrary, Eq. 2 has only one possible solution $(F_6, F_7, F_8)=(0, 0, 1)$ since only uh can guarantee $u_h$ to be non zero and F to be homogeneous. Therefore, the transformation F must have the form $$F = \begin{bmatrix} F_0 & F_1 & 0 \\ F_3 & F_4 & 0 \\ 0 & 0 & 1 \end{bmatrix}$$

which corresponds to a camera displacement with no forward (or backward) component.

In practice, the rectified image is unbounded only when the FOE is inside the image. Therefore, any camera motion with a large forward component (making the FOE visible) cannot be rectified with this method. Moreover, as soon as the forward component is large enough, the image points are mapped so far apart that the rectification becomes unusable due to severe distortion.

The method and apparatus of the present invention alleviates these problems by making a different use of linear transformations in projective space.

SUMMARY OF THE INVENTION

Therefore, it is an object of the present invention to provide a method for cylindrical rectification of a first and second image to form a stereoscopic image which finds a set of epipolar lines that cover the stereoscopic image while introducing a minimum of distortion.

It is a further object of the present invention to provide a method for cylindrical rectification of a first and second image to form a stereoscopic image for arbitrary camera motions.

It is yet a further object of the present invention to provide a method for cylindrical rectification of a first and second image which preserves epipolar line lengths, thus ensuring minimal loss of pixel information which provides rectified images that are always bounded and have a size independent of camera motion.

Accordingly, a method for rectifying first and second images of a single scene for stereoscopic analysis is provided. The method comprises first and second steps of providing the first and second images from first and second cameras. The first camera having a first optical center and a first geometry relative to the scene, the second camera having a second optical center and a second geometry relative to the scene. The first and second images each comprise a plurality of epipolar lines wherein each point on each of the epipolar lines is expressed in a first and second image coordinate system, respectively. A third step is provided wherein each point on each epipolar line of the first image is rotated to be parallel to a line connecting the first and second optical centers of the first and second cameras. Similarly, a fourth step provides for rotation of each point on each epipolar line of the second image to be parallel to the line connecting the first and second optical centers of the first and second cameras. In a fifth step, the first image coordinate system of each point on each of the epipolar lines of the first image is transformed to a first cylindrical coordinate system. Similarly, in a sixth step, the second image coordinate system of each point on each of the epipolar lines of the second image is transformed to a second cylindrical coordinate system. In a seventh step, each rotated epipolar line of the first image expressed in the first cylindrical coordinate system is projected onto the surface of a first cylinder having a first diameter, wherein each projected epipolar line of the first image has a position around the first cylinder surface such that a rectified first image is formed thereon. Lastly, in an eighth step, each rotated epipolar line of the second image expressed in the second cylindrical coordinate system is projected onto the surface of a second cylinder having a second diameter, wherein each projected epipolar line of the second image has a position around the second cylinder surface such that a rectified second image is formed thereon.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Figure 1:
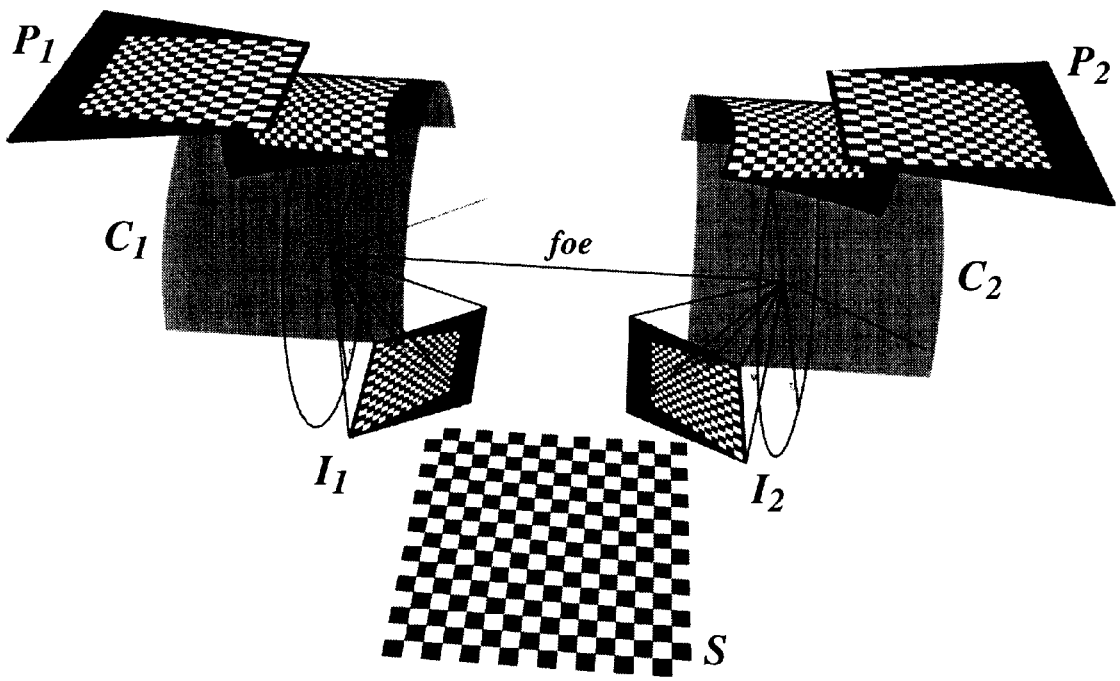
FIG. 1 illustrates rectification showing stereo images ($I_1$, $I_2$) of scene S shown with planar rectification ($P_1$, $P_2$) and cylindrical rectification ($C_1$, $C_2$)
Figure 2:
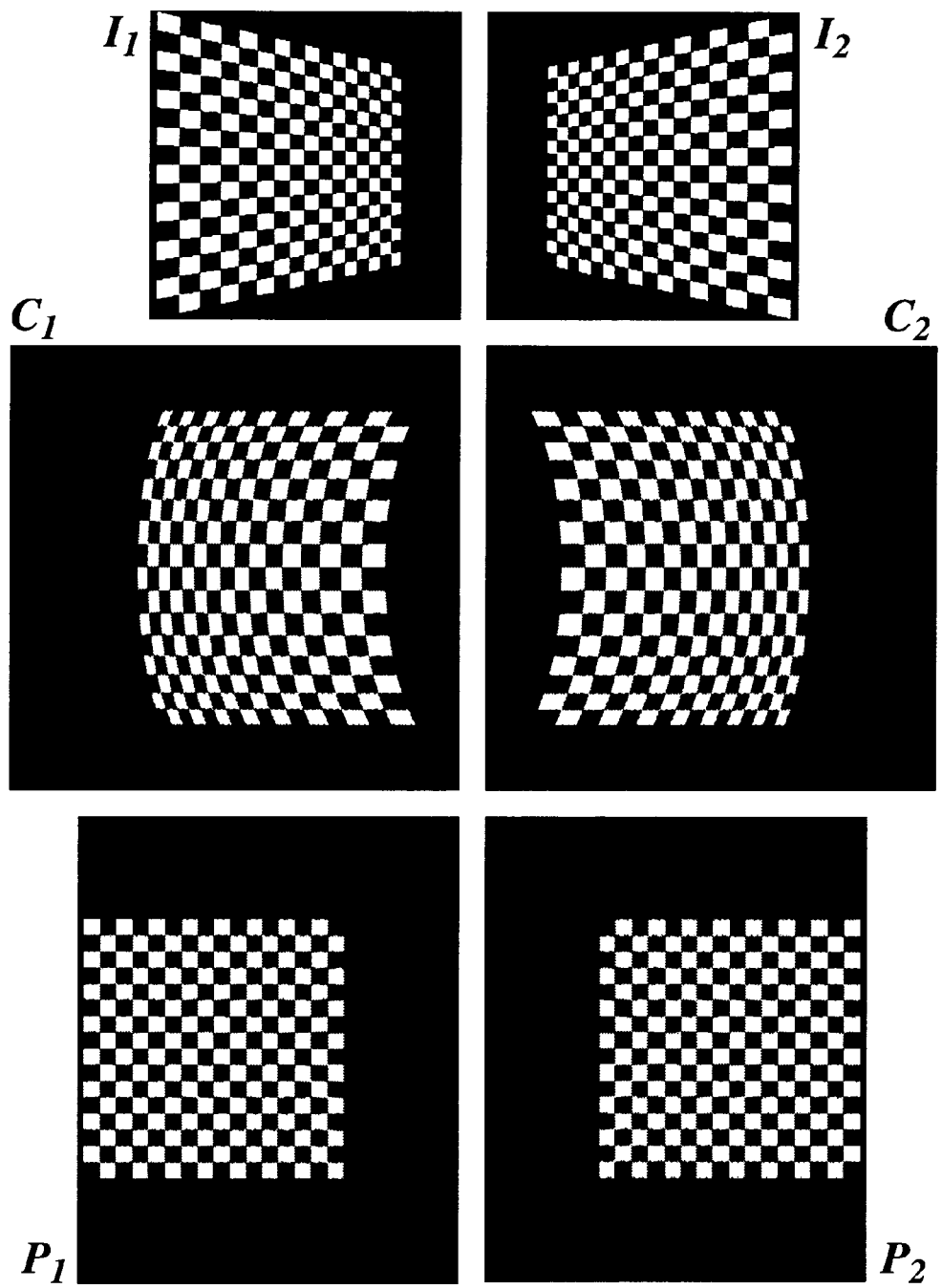
FIG. 2 illustrates original images ($I_1$, $I_2$) of FIG. 1, shown with cylindrical rectification ($C_1$, $C_2$) and planar rectification ($P_1$, $P_2$)

The rectification method of the present invention, referred to as cylindrical rectification, uses a transformation that remaps the images onto the surface of a cylinder whose principal axis goes through both cameras' optical centers as shown in FIG. 1, and images $C_1$ and $C_2$. The actual images related for FIG. 1 are shown in FIG. 2.

Unlike planar rectification, cylindrical rectification is guaranteed to provide a bounded rectified image and significantly reduce pixel distortion, for all possible camera motions. This transformation also preserves epipolar line length. For example, an epipolar line 100 pixels long will always be rectified to a line 100 pixels long. This ensures a minimal loss of pixel information when resampling the epipolar lines from the original images. However, arbitrary straight lines are no longer preserved, though this may only be a concern for edge based stereo.

Planar rectification uses a single linear transformation matrix applied to the image, making it quite efficient. Cylindrical rectification uses one such linear transformation matrix for each epipolar line. In many cases, these matrices can be precomputed so that a similar level of performance can be achieved.

Although it is usually assumed that internal camera parameters are known, cylindrical rectification works as well with unknown internal parameters, as it is the case when only the Fundamental matrix (described in Q. T. Luong et al. (1996) "The fundamental matrix: Theory, algorithms and stability analysis" *Int. J. Computer Vision* 17: pgs. 43–75) is available (discussed below).

The goal of cylindrical rectification is to apply a transformation of an original image to remap on the surface of a carefully selected cylinder instead of a plane. By using the line joining the camera's optical centers as the cylinder axis (see FIG. 1), all straight lines on the cylindrical surface are necessarily parallel to the cylinder axis and focus of expansion, making them suitable to be used as epipolar lines.

Figure 3:
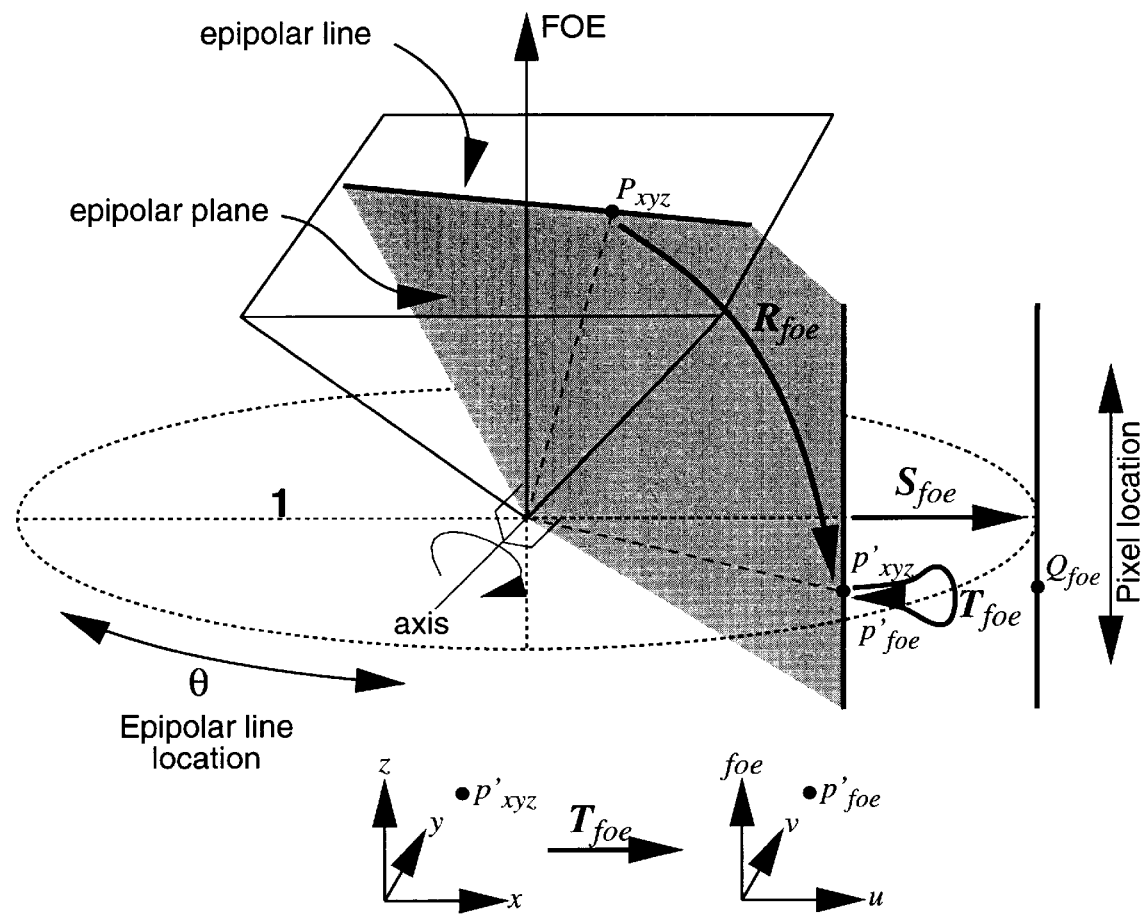
FIG. 3 illustrates the basic steps of the cylindrical rectification method, $R_{FOE}$, $T_{FOE}$, and $S_{FOE}$.

Before discussing each of the steps of the cylindrical rectification method of the present invention in detail, an overview is first provided with reference to FIG. 3. The method for rectifying first and second images of a single scene for stereoscopic analysis comprises first and second steps of providing the first and second images from first and second cameras. The first and second cameras have a first and second optical centers and first and second geometries relative to the scene. The first and second images each comprise a plurality of epipolar lines wherein each point on each of the epipolar lines is expressed in a first and second image coordinate system, respectively.

Preferably, the first and second cameras are still cameras in which simultaneous pictures are taken of the same scene. However, the first and second images can also be provided by a single camera which moves relative to the scene and which takes pictures at two different locations relative to the scene, the two pictures becoming the first and second images. Lastly, a video camera can also be used in the method of the present invention. In this situation, the video camera also moves relative to the scene and takes a number of pictures per unit time, such as 30 pictures per second. From these pictures two consecutive pictures of the scene are selected as the first and second images.

A third step is provided wherein each point on each epipolar line of the first image is rotated to be parallel to a line connecting the first and second optical centers of the first and second cameras. Similarly, a fourth step provides for rotation of each point on each epipolar line of the second image to be parallel to the line connecting the first and second optical centers of the first and second cameras. The third and fourth steps are preferably carried out with linear transformation $R_{foe}$ which rotates the epipolar lines to be parallel to the focus of expansion of the cameras, as discussed below in greater detail. The rotation of points on the epipolar lines preferably starts from a leftmost point on the line and proceeds towards the rightmost point on the line.

In a fifth step, the first image coordinate system of each point on each of the epipolar lines of the first image is transformed to a first cylindrical coordinate system. Similarly, in a sixth step, the second image coordinate system of each point on each of the epipolar lines of the second image is transformed to a second cylindrical coordinate system. The transformations are preferably accomplished with transformation matrix $T_{foe}$, as discussed below in greater detail.

In a seventh step, each rotated epipolar line of the first image expressed in the first cylindrical coordinate system is projected onto the surface of a first cylinder having a first diameter, wherein each projected epipolar line of the first image has a position around the first cylinder surface such that a rectified first image is formed thereon. Lastly, in an eighth step, each rotated epipolar line of the second image expressed in the second cylindrical coordinate system is projected onto the surface of a second cylinder having a second diameter, wherein each projected epipolar line of the second image has a position around the second cylinder surface such that a rectified second image is formed thereon. The epipolar lines are preferably transformed and projected starting at the top of the image and proceeding to the bottom of the image until all epipolar lines have been processed.

Additionally, the first and second rectified images can be output to an output device, such as printer or display device, where they are used for such applications as stereo matching to compute depth information or in mosaicing where groups of first and second rectified images are accumulated for each scene of a motion sequence comprising a plurality of scenes for producing a mosaic of the motion sequence.

The transformation from image to cylinder, illustrated in FIG. 3, is performed in three stages. First, a rotation is applied to a selected epipolar line (step $R_{FOE}$). This rotation is in the epipolar plane and makes the epipolar line parallel to the FOE. Then, a change of coordinate system is applied (step $T_{FOE}$) to the rotated epipolar line from the image system to the cylinder system (with FOE as principal axis). Finally, (step $S_{FOE}$), this line is normalized or reprojected onto the surface of a cylinder of unit diameter. Since the line is already parallel to the cylinder, it is simply scaled along the direction perpendicular to the axis until it lies at unit distance from the axis. A particular epipolar line is referenced by its angle θ around the cylinder axis, while a particular pixel on the epipolar line is referenced by its angle and position along the cylinder axis (see FIG. 3).

Even if the surface of the cylinder is infinite, it can be shown that the image on that surface is always bounded. Since the transformation aligns an epipolar line with the axis of the cylinder, it is possible to remap a pixel to infinity only if its epipolar line is originally infinite. Since the original image is finite, all the visible parts of the epipolar lines are also of finite length, and therefore, the rectified image cannot extend to infinity.

The rectification process transforms an image point $P_{xyz}$ into a new point $q_{FOE}$, which is expressed in the coordinate system FOE of the cylinder. The transformation matrix $L_{FOE}$ is defined so that the epipolar line containing $P_{xyz}$ will become parallel to the cylinder axis, the FOE. Since all possible epipolar lines will be parallel to the FOE, they will also be parallel to one another and, thus, form the desired parallel aligned epipolar geometry.

We have the linear rectification relations between $q_{FOE}$ and $P_{xyz}$ stated as $$q_{FOE} = L_{FOE} p_{xyz} \quad (3)$$
$$= (S_{FOE} T_{FOE} R_{FOE}) p_{xyz}$$

and inversely $$P_{xyz} = L_{FOE}^{-1} q_{FOE} \quad (4)$$
$$= (R_{FOE}^T T_{FOE}' S_{FOE}^{-1}) q_{FOE}$$

where $$S_{FOE} = \begin{bmatrix} 1 & 0 & 0 \\ 0 & \frac{1}{k} & 0 \\ 0 & 0 & \frac{1}{k} \end{bmatrix} \text{ and } T_{FOE} = \begin{bmatrix} FOE \\ u \\ v \end{bmatrix}$$

These relations are completely invertible (except for the special case $P_{xyz}$=FOE, which is quite easily handled). The matrix $R_{FOE}$ represents the rotation of the image point in projective space. The matrix $T_{FOE}$ represents the change from the camera coordinate system to the cylinder system. The matrix $S_{FOE}$ represents the projective scaling used to project rectified point onto the surface of the unit cylinder.

Computing the coordinate transformation $T_{FOE}$, the rotation $R_{FOE}$, and the scaling $S_{FOE}$ will next be discussed with regard to FIG. 3 and the following equations.

The matrix $T_{FOE}$ is the coordinate transformation matrix from system (x; y; z) to system (FOE; u; v) such that $$q_{FOE} = T_{FOE} q_{xyz}$$
$$q_{xyz} = T_{FOE} q_{FOE} \quad (5)$$

and is uniquely determined by the position and motion of the cameras (see FIG. 3).

Any camera has a position, designated as "pos" and a rotation of e degrees around the axis relative to the world coordinate system. A homogeneous world point $p_w$ is expressed in the system of camera a (with $pos_a$, $axis_a$ and $\theta_a$) as $$p_a = R_{aw} p_w$$

where $R_{aw}$ is the 4×4 homogeneous coordinate transformation matrix obtained as $$R_{aw} = \begin{bmatrix} rot(axis0_a, -\emptyset_a) & 0 \\ & 1 \end{bmatrix} \begin{bmatrix} I & -pos_a \\ 0 & 1 \end{bmatrix}$$
$$= \begin{bmatrix} r_{aw} & -r_{aw} \cdot pos_a \\ 0 & 1 \end{bmatrix}$$

where $$r_{aw} = rot(axis_a, -\emptyset_a)$$

and rot (A, θ) is a 3×3 rotation matrix of angle θ around axis A. The corresponding matrix $R_{bw}$ for camera b with $pos_b$, $axis_b$ and $\theta_b$ is defined in a similar way.

The direct coordinate transformation matrices for camera a and b such that $$p_a = R_{ab} p_b$$
$$p_b = R_{ba} p_a$$

are defined as $$R_{ab} = R_{aw} \cdot R_{bw}^{-1} = \begin{bmatrix} r_{ba} & FOE_b \\ 0 & 1 \end{bmatrix}$$
$$R_{ba} = R_{bw} \cdot R_{aw}^{-1} = \begin{bmatrix} r_{ba} & FOE_a \\ 0 & 1 \end{bmatrix}$$

where $$r_{ab} = r_{aw} r_{bw}^T$$
$$r_{ba} = r_{bw} r_{aw}^T$$
$$FOE_a = r_{aw} \cdot (pos_b - pos_a)$$
$$FOE_b = r_{bw} \cdot (pos_a - pos_b)$$

from which we can derive the matrix $T_{FOE;a}$ for rectifying the image of camera a as $$T_{FOE;a} = \begin{bmatrix} n(FOE_a) \\ n(z \times FOE_A) \\ N(FOE_a \times (z \times FOE_a)) \end{bmatrix} \quad (6)$$

wherein $n(v) = v/\|v\|$ is a normalizing function. The corresponding matrix $T_{FOE;b}$ for rectifying the image of camera b can be derived similarly or more simply by the relation $$T_{FOE;b} = T_{FOE;a} r_{ab} \quad (7)$$

The epipolar line containing a point $p_{xyz}$ will be rotated around the origin (the camera's optical center) and along the epipolar plane until it becomes parallel to the FOE. The epipolar plane containing $p_{xyz}$ also contain the FOE (by definition) and the origin. The normal of that plane is $$axis = FOE \times p_{xyz} \quad (8)$$

and will be the axis of rotation (see FIG. 3), thus ensuring that $p_{xyz}$ remains in the epipolar plane. In the case $p_{xyz}$=FOE, the axis can be any vector normal to the FOE vector.

The angle of rotation needed can be computed by using the fact that the normal of the image plane $z = (0, 0, 1)^T$ has to be rotated until it is perpendicular to the FOE. This is because the new epipolar line has to be parallel to the FOE. The rotation angle is the angle between the normal $z = (0, 0, 1)^T$ projected on the epipolar plane (perpendicular to the rotation axis) and the plane normal to the FOE also containing the origin. By projecting the point $P_{xyz}$ onto that plane, we can directly compute the angle. We have z', the normal z projected on the epipolar plane defined as $$z' = axis \times (z \times axis) = \begin{bmatrix} -axis_x axis_z \\ -axis_y axis_z \\ axis_x^2 + axis_y^2 \end{bmatrix}$$

and p', the projected $P_{xyz}$ on the plane normal to the FOE, defined as $$p' = T_{FOE}^T B T_{FOE} p_{xyz} \quad (9)$$

where $T_{FOE}$ was previously defined in Eq. 6

The rotation matrix $R_{FOE}$ rotates the vector z' onto the vector p' around the axis of Eq. 8 and is defined as $$R_{FOE} = rot_{p', z'} \quad (10)$$

where $\text{rot}_{a,b}$ rotates vector b onto vector a such that $$rot_{a,b} = \begin{bmatrix} n(a) \\ n(a \times b) \\ n((a \times b) \times a) \end{bmatrix}^T \begin{bmatrix} n(a) \\ n(a \times b) \\ n((a \times b) \times b) \end{bmatrix}$$

If the point $q_{FOE}$ is available instead of point $p_{xyz}$ (as would be the case for the inverse transformation of Eq. 4), we can still compute $R_{FOE}$ from Eq. 10 by substituting $q_{xyz}$ for $p_{xyz}$ in Eq. 8 and 9 where $q_{xyz}$ is derived from $q_{FOE}$ using Eq. 5. Notice that because $p_{xyz}$ and $q_{xyz}$ are in the same epipolar plane, the rotation axis will be the same. Also, the angle of rotation will also be the same since their projection onto the plane normal to the FOE is the same (modulo a scale factor).

The matrix $S_{FOE}$ is used to project the epipolar line from the unit image plane (i.e., located at z=1) onto the cylinder of unit radius. To simplify notation in the following equation, we define $$A = \begin{bmatrix} 1 & 0 & 0 \\ 0 & 0 & 0 \\ 0 & 0 & 0 \end{bmatrix}$$

$$B = \begin{bmatrix} 0 & 0 & 0 \\ 0 & 1 & 0 \\ 0 & 0 & 1 \end{bmatrix}$$

As shown in Eq. 3 and Eq. 4, $S_{FOE}$ has one scalar parameter k. This parameter can be computed for a known point $p_{xyz}$ (Eq. 3) by enforcing unit radius and solving the resulting equation $$\|B\ q_{FOE}\| = 1 \tag{11}$$

$$\left\| B \begin{bmatrix} 1 & 0 & 0 \\ 0 & \frac{1}{k} & 0 \\ 0 & 0 & \frac{1}{k} \end{bmatrix} T_{FOE} R_{FOE} P_{XYZ} \right\| = 1$$

which yields the solution $$k = \|BT_{FOE}R_{FOE}P_{xyz}\|$$

For the case of a known point $q_{FOE}$ (Eq. 4), enforcing that the epipolar lines all have their z coordinates equal to 1 gives the equation $$\begin{bmatrix} 0 \\ 0 \\ 1 \end{bmatrix} \cdot P_{XYZ} = 1$$

$$\begin{bmatrix} 0 \\ 0 \\ 1 \end{bmatrix} \cdot \left( R_{FOE}^T T_{FOE}^T \begin{bmatrix} 1 & 0 & 0 \\ 0 & k & 0 \\ 0 & 0 & k \end{bmatrix} q_{FOE} \right) = 1$$

which can be simplified to $$(T_{FOE}c_3)\cdot(A\ q_{FOE}) + k(T_{FOE}c_3)\cdot(Bq_{FOE}) = 1$$

where $c_3$ is the third column of rotation matrix $R_{FOE}$. The solution is then $$k = \frac{1 - (T_{FOE}c_3)\cdot(A\ q_{FOE})}{(T_{FOE}c_3)\cdot(B\ q_{FOE})}$$

It should be noted that the denominator can never be zero because of Eq. 11 and the fact that $T_{FOE}c_3$ can never be zero or orthogonal to $B\ q_{FOE}$.

In general, a rectified image does not span the whole cylinder. The common angle interval is the interval that yields all common epipolar lines between two views. In order to control the number of epipolar lines extracted, it is important to determine this interval for each image.

Notice that the rectification process implicitly guarantees that a pair of corresponding epipolar lines have the same angle on their respective cylinder and, therefore, the same row in the rectified images. The concern here is to determine the angle interval of epipolar lines effectively present in both images.

It can be shown that a rectified image does not span the whole cylinder, then the extremum angles are given by two corners of the image. Based on this fact, it is sufficient to compute the angle of the four corners and one point between each pair of adjacent corners. By observing the ordering of these angles and taking into account the periodicity of angle measurements, it is possible to determine the angle interval for one image.

Given the angle intervals computed for each image separately, their intersection is the common angle interval sought. The subsequent stereo matching process has only to consider epipolar lines in that interval.

Until now, it was always assumed that the cameras where calibrated, i.e., their internal parameters are known. The parameters are the principal point (optical axis), focal lengths and aspect ratio. More generally, we can represent all these parameters by a 3×3 upper triangular matrix. In this section, we assume that only the fundamental matrix is available. This matrix effectively hides the internal parameters with the camera motion (external parameters) in a single matrix.

The fundamental matrix F defines the epipolar relation between points $p_a$ and $p_b$ of the images as $$p_b^T \cdot F \cdot p_a = 0 \tag{12}$$

It is straightforward to extract the focus of expansion for each image by noticing that all points of one image must satisfy Eq. 12 when the point selected in the other image is its FOE. More precisely, the relations for $FOE_a$ and $FOE_b$ are $$p_b^T \cdot F \cdot FOE_a = 0\ \forall p_b$$

$$FOE_b^T \cdot F \cdot p_a = 0\ \forall p_a$$

which yields the homogeneous linear equation systems $$F \cdot FOE_a = 0 \tag{13}$$

$$F \cdot FOE_b = 0 \tag{14}$$

which are easily solved.

At this point, it remains to show how to derive the constituent of matrix $L_{FOE}$ of Eq. 3 from the fundamental matrix F. These are the matrices $S_{FOE}$, $R_{FOE}$ and $T_{FOE}$.

The transformation $T_{FOE;a}$ can be directly obtained from Eq. 6 using $FOE_a$ obtained in Eq. 13. Symmetrically (using Eq. 14) we obtain $$T_{FOE,b} = \begin{bmatrix} n(FOE_b) \\ n(z \times FOE_b) \\ n(FOE_b \times (z \times FOE_b)) \end{bmatrix}$$

The rotation matrix $R_{FOE}$ is computed from the FOE (which is readily available from the fundamental matrix F) and the-transform matrix $T_{FOE}$, exactly as described above.

Since the scaling matrix $S_{FOE}$ is directly computed from the value of rotation matrix $R_{FOE}$ and transform $T_{FOE}$, it is computed exactly as described above.

The rectification method is applicable regardless of the availability of the internal camera parameters. However, without these parameters, it is impossible to determine the minimum and maximum disparity interval, which is of great utility in a subsequent stereo matching. In this paper, all the results obtained are performed with known internal parameters.

The distortion induced by the rectification process in conjunction with the resampling of the original image can create a loss of pixel information, i.e., pixels in the original image are not accounted for and the information they carry is simply discarded during resampling. We measure this loss along epipolar lines, since it is along these lines that a subsequent stereo process will be carried out. To establish a measure of pixel information loss, we consider a rectified epipolar lines segments of a length of one pixel and compute the length L of the original line segment that is remapped to it. For a given length L, we define the loss as $$\text{loss}(L) = \begin{cases} 0 & L \le 1 \\ 1 - 1/L & L > 1 \end{cases}$$

A shrinking of original pixels (i.e., L>1) creates pixel information loss while a stretching (i.e., L<1) simply reduce the density of the rectified image. For a whole image, the measure is the expected loss over all rectified epipolar lines, broken down into individual one pixel segments.

Figure 4:
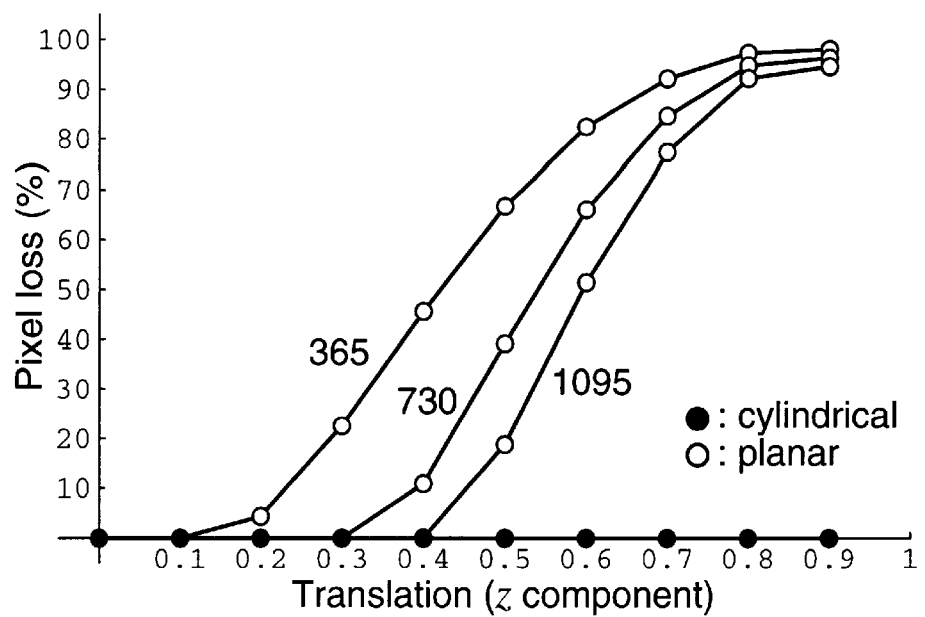
FIG. 4 illustrates pixel loss as a function of camera translation, $T=(1, 0, z)$.

The fundamental property of cylindrical rectification is the conservation of the length of epipolar lines. Since pixels do not stretch or shrink on these lines, no pixel information is lost during resampling, except for the unavoidable loss introduced by the interpolation process itself. For planar rectification, the length of epipolar lines is not preserved. This implies that some pixel loss will occur if the rectified image size is not large enough. In FIG. 4, three different rectified image widths (365, 730, 1095 pixels) were used with both methods, for a range of camera translations T=(1, 0, z) with a z component in the range z∈[0, 1]. Cylindrical rectification shows no loss for any camera motion and any rectified image width. [The minimum image width that guarantees no pixel loss is equal to $$\sqrt{w^2 + h^2}$$

for an original image of size (w, h).] However, planar rectification induces a pixel loss that depends on the camera geometry. To compensate for such a loss, the rectified images have to be enlarged, sometimes to the point where they become useless for subsequent stereo processing. For a z component equal to 1, i.e., T=(1, 0, 1), all pixels are lost, regardless of image size.

EXAMPLES

Figure 5:
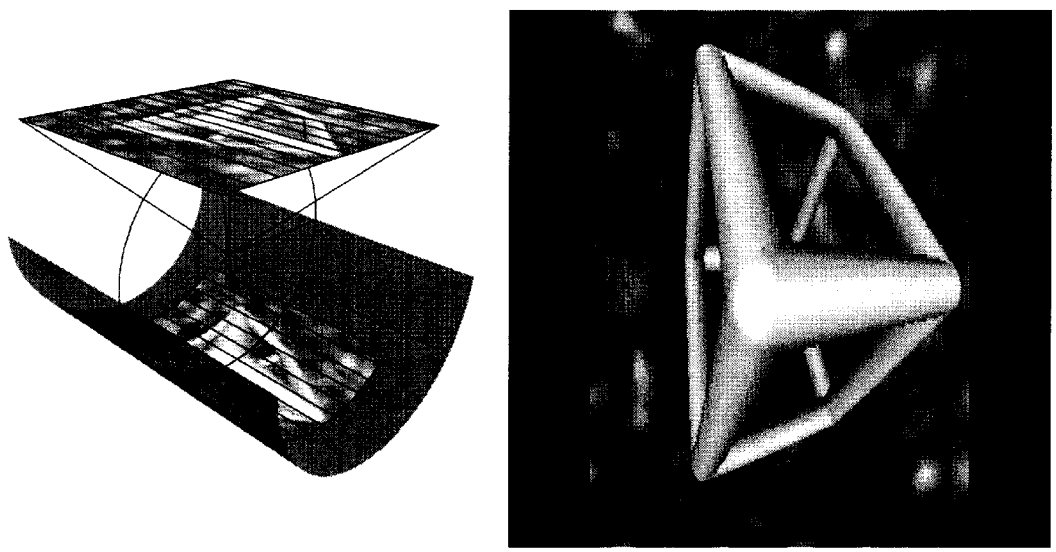
FIG. 5 illustrates an image of a rectified cube with horizontal camera motion, [FOE=(1, 0, 0)] and a row representing an individual epipolar line.

Some examples of rectification applied to different camera geometries will now be illustrated. FIG. 5 presents an image plane and the rectification cylinder with the reprojected image, for a horizontal camera motion. In this case, the epipolar lines are already aligned. The rows represent different angles around the cylinder, from 0° to 360°. The image always appears twice, since every cylinder point is projective across the cylinder axis. The number of rows determine the number of epipolar lines that are extracted from the image.

Figure 6:
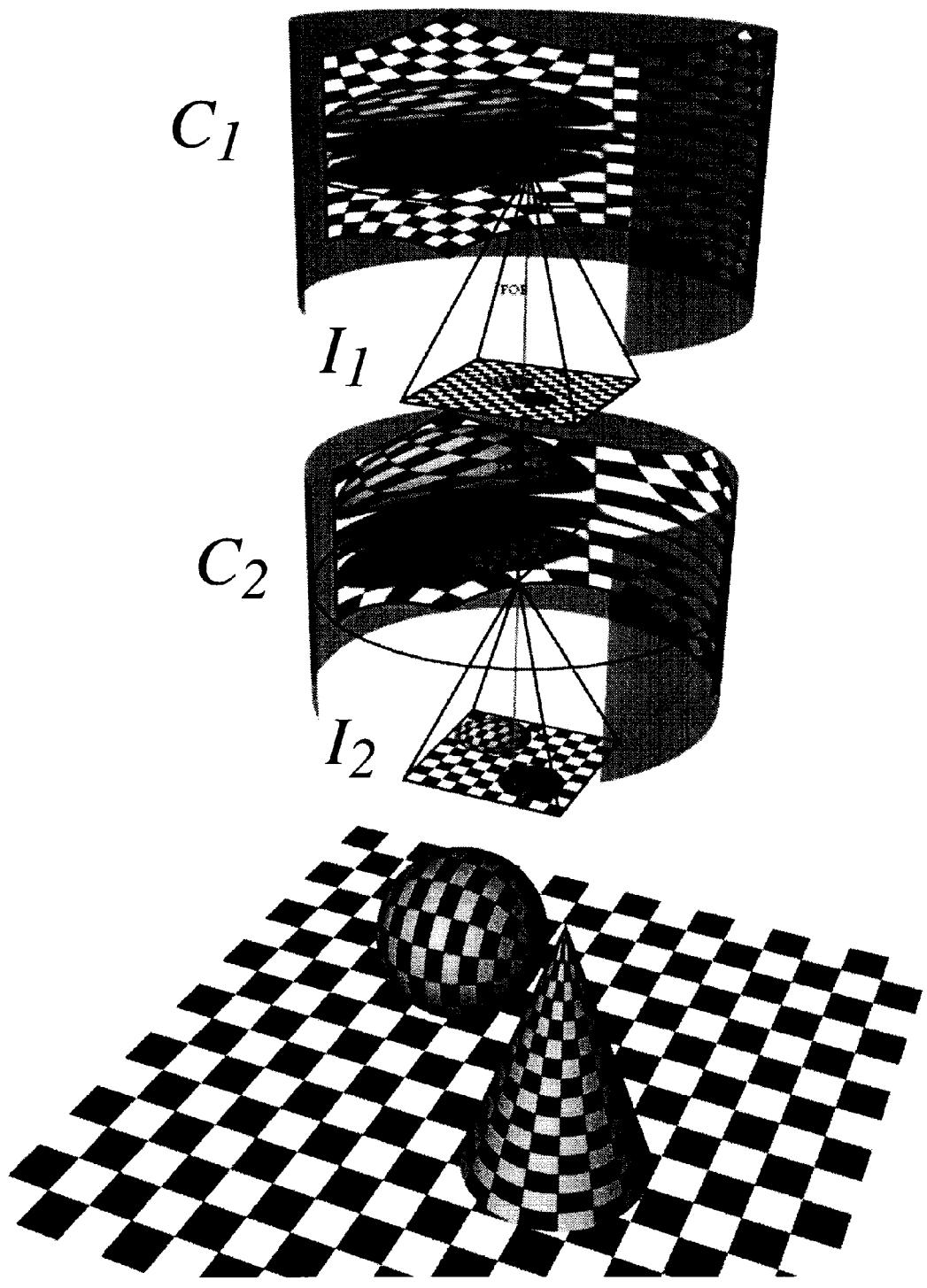
FIG. 6 illustrates forward motion showing a sphere and cone observed from two cameras displaced along their optical axis where the original images $I_1$, $I_2$ are remapped onto the cylinder as $C_1$, $C_2$.
Figure 7:
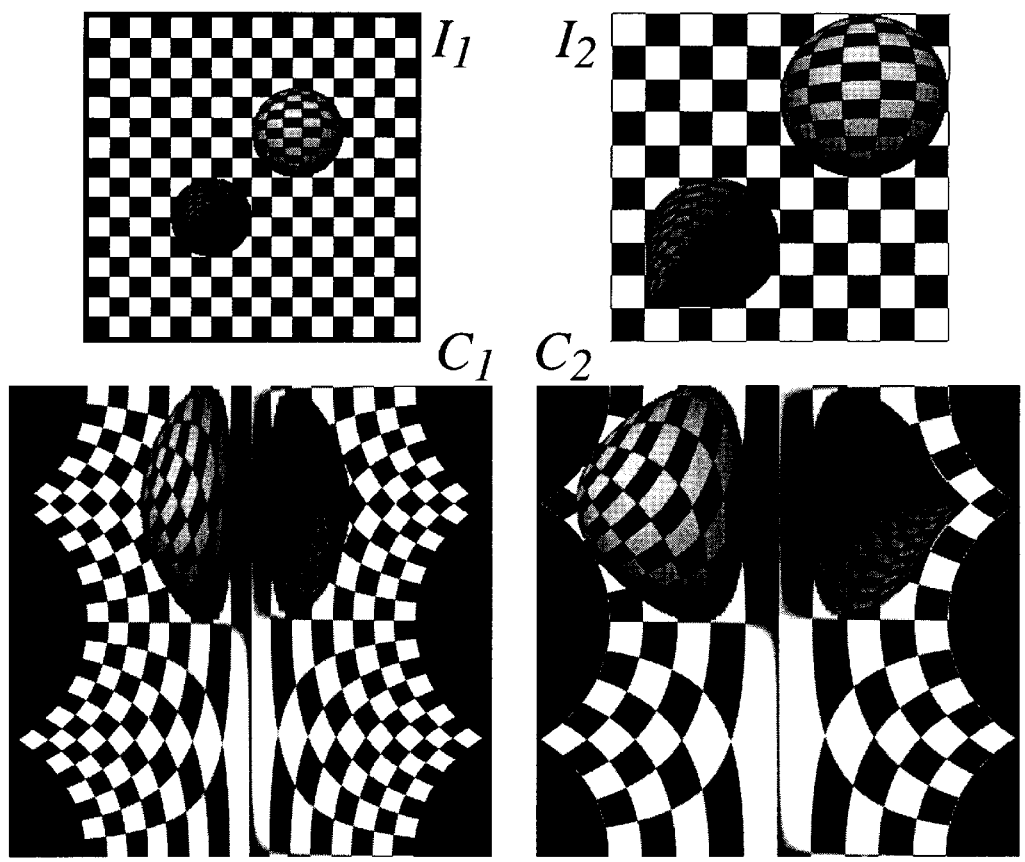
FIG. 7 illustrates rectification of forward camera motion, where the images $I_1$, $I_2$ are shown with their cylindrical rectification $C_1$, $C_2$, and where the rectified image displacements are all horizontal.

FIG. 6 depicts a camera geometry with forward motion. The original and rectified images are shown in FIG. 7 (planar rectification cannot be used in this case). Notice how the rectified displacement of the sphere and cone is purely horizontal, as expected.

Figure 8:
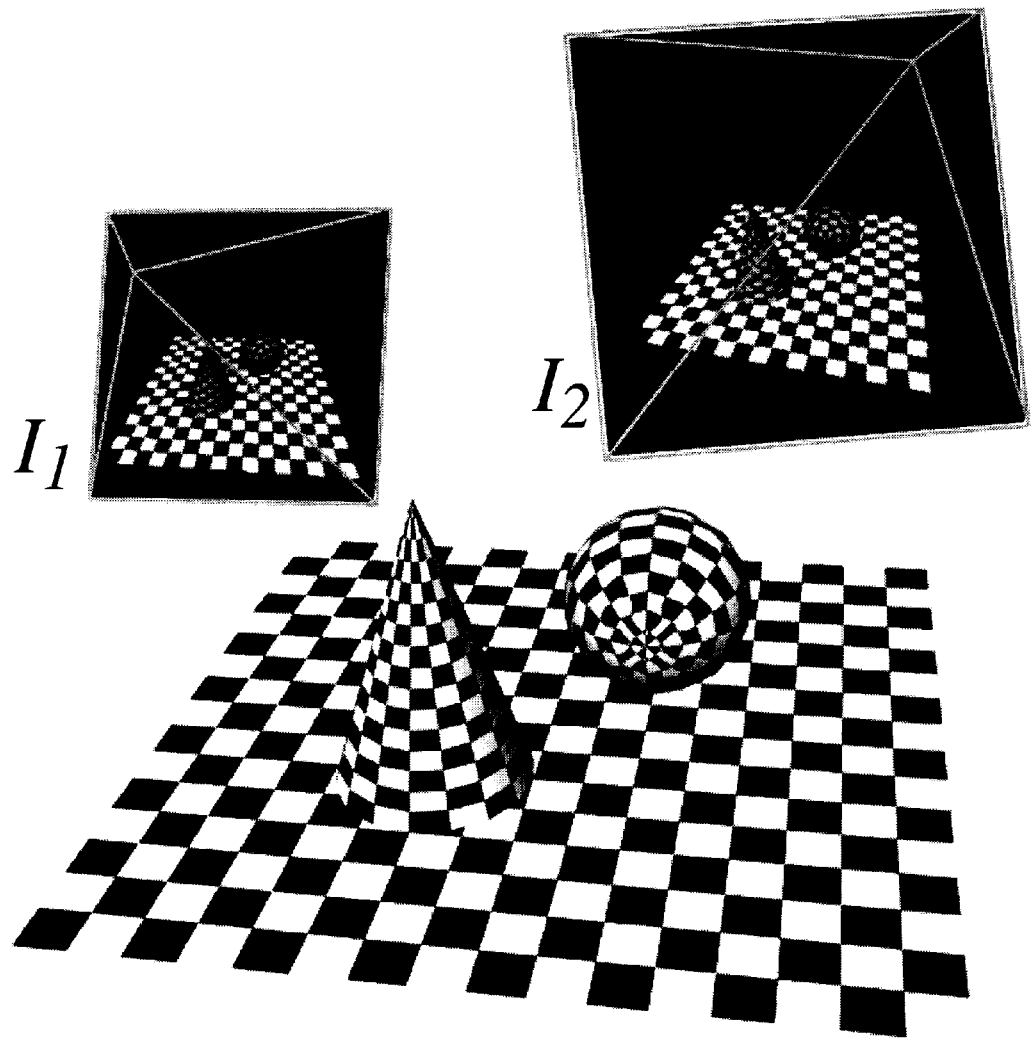
FIG. 8 illustrates camera geometry suitable for planar rectification, where $I_1$ and $I_2$ are the original images.
Figure 9:
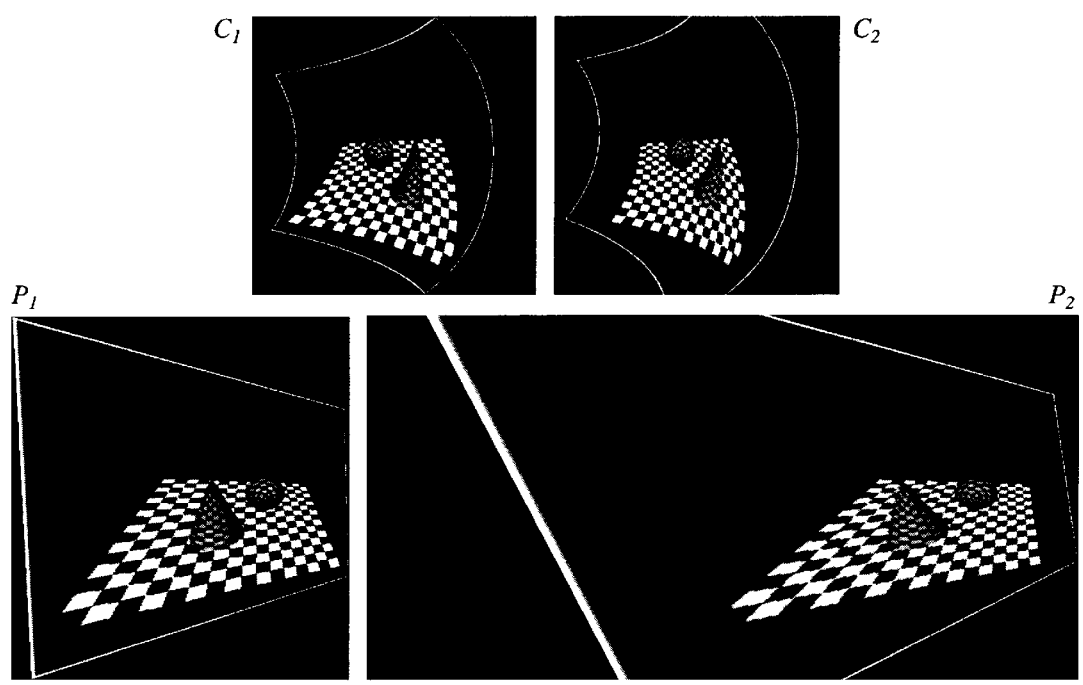
FIG. 9 illustrates rectified images showing both cylindrical rectification ($C_1$, $C_2$) and planar rectification ($P_1$, $P_2$)

FIG. 8 depicts a typical camera geometry, suitable for planar rectification, with rectified images shown in FIG. 9. While the cylindrical rectification (images $C_1$, $C_2$ in FIG. 9) introduces little distortion, planar rectification (images $P_1$, P2) significantly distorts the images, which are also larger to compensate for pixel information loss.

Examples where the FOE is inside the image are obtained when the forward component of the motion is large enough with respect to the focal length (as in FIG. 7). It is important to note that planar rectification always yields an unbounded image (i.e., infinite size) for these cases and, thus, cannot be applied.

The execution time for both methods is very similar. For many camera geometries, the slight advantage of planar rectification relating to the number of matrix computation is overcome by the extra burden of resampling larger rectified images to reduce pixel loss.

The present invention disclosed herein presents a novel method and apparatus for cylindrical rectification for rectifying stereoscopic images under arbitrary camera geometry. It effectively remaps the images onto the surface of a unit cylinder whose axis goes through both cameras' optical centers. It applies a transformation in projective space to each image point. A single linear transformation is required per epipolar line to rectify. It preserves epipolar line lengths, thus ensuring minimal loss of pixel information. As a consequence of allowing arbitrary camera motions, the rectified images are always bounded, with a size independent of camera motion.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for rectifying first and second images of a single scene for stereoscopic analysis, the method comprising the steps of:

provided the first image from a first camera having a first optical center and a first geometry relative to the scene, the first image comprising a plurality of epipolar lines wherein each point on each of the epipolar lines is expressed in a first image coordinate system;

providing the second image from a second camera having a second optical center and a second geometry relative to the scene, the second image comprising a plurality of epipolar lines wherein each point on each of the epipolar lines is expressed in a second image coordinate system;

rotating each point on each epipolar line of the first image to be parallel to a line connecting the first and second optical centers of the first and second cameras;

rotating each point on each epipolar line of the second image to be parallel to the line connecting the first and second optical centers of the first and second cameras;

transforming the first image coordinate system of each point on each of the epipolar lines of the first image to a first cylindrical coordinate system;

transforming the second image coordinate system of each point on each of the epipolar lines of the second image to a second cylindrical coordinate system;

projecting each rotated epipolar line of the first image expressed in the first cylindrical coordinate system onto the surface of a first cylinder having a first diameter, wherein each projected epipolar line of the first image has a position around the first cylinder surface such that a rectified first image is formed thereon; and projecting each rotated epipolar line of the second image expressed in the second cylindrical coordinate system onto the surface of a second cylinder having a second diameter, wherein each projected epipolar line of the second image has a position around the second cylinder surface such that a rectified second image is formed thereon.

2. The method of claim 1, wherein the first and second cameras are still cameras oriented arbitrarily to each other and in which the first and second images are simultaneous pictures of the scene.

3. The method of claim 1, wherein the first and second camera comprise a single still camera which moves relative to the scene and takes two still pictures of the scene, one being the first image at the first geometry relative to the scene, and the other being the second image relative to the scene.

4. The method of claim 1, wherein the first and second camera comprise a single video camera which moves relative to the scene and takes two consecutive pictures of the scene, one being the first image at the first geometry relative to the scene, and the other being the second image relative to the scene.

5. The method of claim 1, wherein the first and second image coordinate system is an x,y,z coordinate system with their origin at the respective optical center of the first and second camera.

6. The method of claim 5, wherein the transformation steps for the epipolar lines of one of the first and second images, are done according to the following equations, where the first image is denoted as a, and the second image as b:

$$T_{FOE;a} = \begin{bmatrix} n(FOE_a) \\ n(z \times FOE_a) \\ n(FOE_a \times (z \times FOE_a)) \end{bmatrix}$$

$$T_{FOE;b} = -T_{FOE;a} \cdot r_{ab}$$

where $n(v) = v/\|v\|$ is a normalizing function, $FOE_a = r_{aw} \cdot (pos_b - pos_a)$ $r_{ab} = r_{aw} r_{bw}^T$ $r_{aw} = rot(axis_{a1}, \phi_a)$ $r_{bw} = rot(axis_{b1}, \phi_b)$ and where $pos_a$, $pos_b$, $axis_a$, $\phi_a$, $axis_b$, $\phi_b$ are camera positions and $rot(A, \theta)$ is a 3×3 rotation matrix of angle $\theta$ around axis A.

7. The method of claim 6, wherein the rotation steps for the epipolar lines of one of the first and second images are done according to the following equations, where the first image is denoted as a, and the second image as b:

$$R_{FOE} = rot_{p', z'}$$

where $$rot_{a,b} = \begin{bmatrix} n(a) \\ n(a \times b) \\ n((a \times b) \times a) \end{bmatrix}^T \begin{bmatrix} n(b) \\ n(a \times b) \\ n((a \times b) \times b) \end{bmatrix}$$

$$z' = axis \times (z \times axis) = \begin{bmatrix} -axis_x axis_z \\ -axis_y axis_z \\ axis_x^2 + axis_y^2 \end{bmatrix}$$

$$p' = T_{FOE}^T B T_{FOE} p_{xyz}$$

$$axis = FOE \times p_{xyz}$$

$$B = \begin{bmatrix} 0 & 0 & 0 \\ 0 & 1 & 0 \\ 0 & 0 & 1 \end{bmatrix}$$

and where $p_{xyz}$ is a point on the epipolar line to rotate and FOE is the focus of expansion of the camera.

8. The method of claim 7, wherein the projection steps for the epipolar lines of one of the first and second images are done according to the following equations;

$$S_{FOE} = \begin{bmatrix} 1 & 0 & 0 \\ 0 & \frac{1}{k} & 0 \\ 0 & 0 & \frac{1}{k} \end{bmatrix}$$

where $$k = \frac{1 - (T_{FOE} c_3) \cdot (A q_{FOE})}{(T_{FOE} c_3) \cdot (B q_{FOE})}$$

$$A = \begin{bmatrix} 1 & 0 & 0 \\ 0 & 0 & 0 \\ 0 & 0 & 0 \end{bmatrix} \quad B = \begin{bmatrix} 0 & 0 & 0 \\ 0 & 1 & 0 \\ 0 & 0 & 1 \end{bmatrix}$$

where $c_3$ is the third column of rotation matrix $R_{FOE}$ and $q_{FOE}$ is a rectified point.

9. The method of claim 1, further comprising the step of outputting the rectified first and second images to an output device for further analysis.

10. The method of claim 9, wherein the output device is selected from a group consisting of a printer and display device.

11. The method of claim 9, further comprising the step of computing depth information from the first and second rectified images for stereo matching analysis.

12. The method of claim 9, further comprising the step of accumulating groups of first and second rectified images for each scene of a motion sequence comprising a plurality of scenes for producing a mosaic of the motion sequence.

* * * * *